(12) United States Patent
Sherrard et al.

(10) Patent No.: US 12,339,012 B2
(45) Date of Patent: Jun. 24, 2025

(54) PORTABLE-DEVICE SUPPORT SYSTEM

(71) Applicant: Cascade Designs, Inc., Seattle, WA (US)

(72) Inventors: Earl Gaylon Sherrard, Ravensdale, WA (US); Joshua R. Buesseler, Seattle, WA (US)

(73) Assignee: Cascade Designs, Inc., Seattle, WA (US)

( * ) Notice: Subject to any disclaimer, the term of this patent is extended or adjusted under 35 U.S.C. 154(b) by 681 days.

(21) Appl. No.: 16/475,639

(22) PCT Filed: Dec. 29, 2017

(86) PCT No.: PCT/US2017/069079
§ 371 (c)(1),
(2) Date: Jul. 2, 2019

(87) PCT Pub. No.: WO2018/128943
PCT Pub. Date: Jul. 12, 2018

(65) Prior Publication Data
US 2021/0131668 A1 May 6, 2021

Related U.S. Application Data

(60) Provisional application No. 62/441,945, filed on Jan. 3, 2017.

(51) Int. Cl.
*F24C 3/14* (2021.01)
*A47J 36/26* (2006.01)
(Continued)

(52) U.S. Cl.
CPC ............... *F24C 3/14* (2013.01); *A47J 36/26* (2013.01); *A47J 36/34* (2013.01); *F24C 1/16* (2013.01); *F24C 3/027* (2013.01); *F24C 15/086* (2013.01)

(58) Field of Classification Search
CPC .......... B62H 1/06; F16M 11/10; F16M 11/38; F16M 11/24
See application file for complete search history.

(56) References Cited

U.S. PATENT DOCUMENTS

| | | | | |
|---|---|---|---|---|
| 579,717 A | * | 3/1897 | Michener | B62H 1/06 280/300 |
| 3,697,031 A | | 10/1972 | Glickman et al. | |

(Continued)

FOREIGN PATENT DOCUMENTS

| | | |
|---|---|---|
| CN | 1012803930 A | 10/2008 |
| FR | 2782373 A1 | 2/2000 |

(Continued)

OTHER PUBLICATIONS

International Patent Application No. PCT/US2017/069079; Int'l Preliminary Report on Patentability; dated Jul. 18, 2019; 9 pages.

(Continued)

*Primary Examiner* — Jason Lau
(74) *Attorney, Agent, or Firm* — BakerHostetler (57) ABSTRACT

A portable-device support apparatus includes a surface element. First support elements are coupled to the surface element. Each first support element has an end proximal to the surface element and an end distal from the surface element. Second support elements are coupled to a respective first support element by a respective fastening device. Each fastening device can translate back and forth along a respective one of the first support elements between the proximal and distal ends. The apparatus has a deployed position in which each second support element extends at an angle from a first support element. The apparatus has a storage position.

7 Claims, 10 Drawing Sheets

(51) Int. Cl.
   *A47J 36/34* (2006.01)
   *F24C 1/16* (2021.01)
   *F24C 3/02* (2021.01)
   *F24C 15/08* (2006.01)

(56) References Cited

U.S. PATENT DOCUMENTS

| | | | | |
|---|---|---|---|---|
| 5,467,692 | A | * | 11/1995 | Perez, III .............. F24C 3/14 |
| | | | | 99/450 |
| 5,638,761 | A | * | 6/1997 | Berkowitz ........... A47B 3/0916 |
| | | | | 108/132 |
| 6,896,322 | B1 | * | 5/2005 | Foy ........................ A47C 9/06 |
| | | | | 297/14 |
| 2003/0178537 | A1 | * | 9/2003 | Ashjaee .............. F16M 11/046 |
| | | | | 248/166 |
| 2005/0109330 | A1 | | 5/2005 | Pestrue et al. |
| 2006/0180139 | A1 | | 8/2006 | Proffitt et al. |
| 2014/0290640 | A1 | | 10/2014 | Kim |
| 2014/0326230 | A1 | | 11/2014 | Hall |
| 2015/0267859 | A1 | | 9/2015 | Carpenter |

FOREIGN PATENT DOCUMENTS

| | | |
|---|---|---|
| GB | 2358918 A | 8/2001 |
| JP | 2002-522743 A | 7/2002 |
| JP | 2014-190691 A | 10/2014 |
| KR | 2016-0142665 A | 12/2016 |
| WO | WO 2016/063091 A2 | 4/2016 |

OTHER PUBLICATIONS

European Patent Application No. 17890345.6; Extended Search Report; dated Jul. 7, 2020; 9 pages.

* cited by examiner

PORTABLE-DEVICE SUPPORT SYSTEM

CROSS-REFERENCE TO RELATED APPLICATIONS

This application is the National Stage Application of International Patent Application No. PCT/US2017/069079, filed Dec. 29, 2017 which claims priority from U.S. Provisional Patent Application No. 62/441,945 titled "Portable-Device Support System" and filed Jan. 3, 2017, the contents of which are hereby incorporated by reference in their entirety as if fully set forth herein.

PRIORITY CLAIM

This application claims priority from U.S. Provisional Patent Application No. 62/441,945 titled "Portable Device Support System" and filed Jan. 3, 2017, the contents of which are hereby incorporated by reference in their entirety as if fully set forth herein.

BACKGROUND

Most legs on which portable devices, such as camping stoves or pots, are supported rotate around a vertical or horizontal axis from a storage position to the desired support position. Some are just removable for storage.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

An embodiment includes support elements, such as legs, that move in a desired path for storage in a confined space. The deployed feet of the legs provide a relatively wide, stable platform to support a load/object, such as a pot. When deployed, the legs stay deployed.

Figure 1:
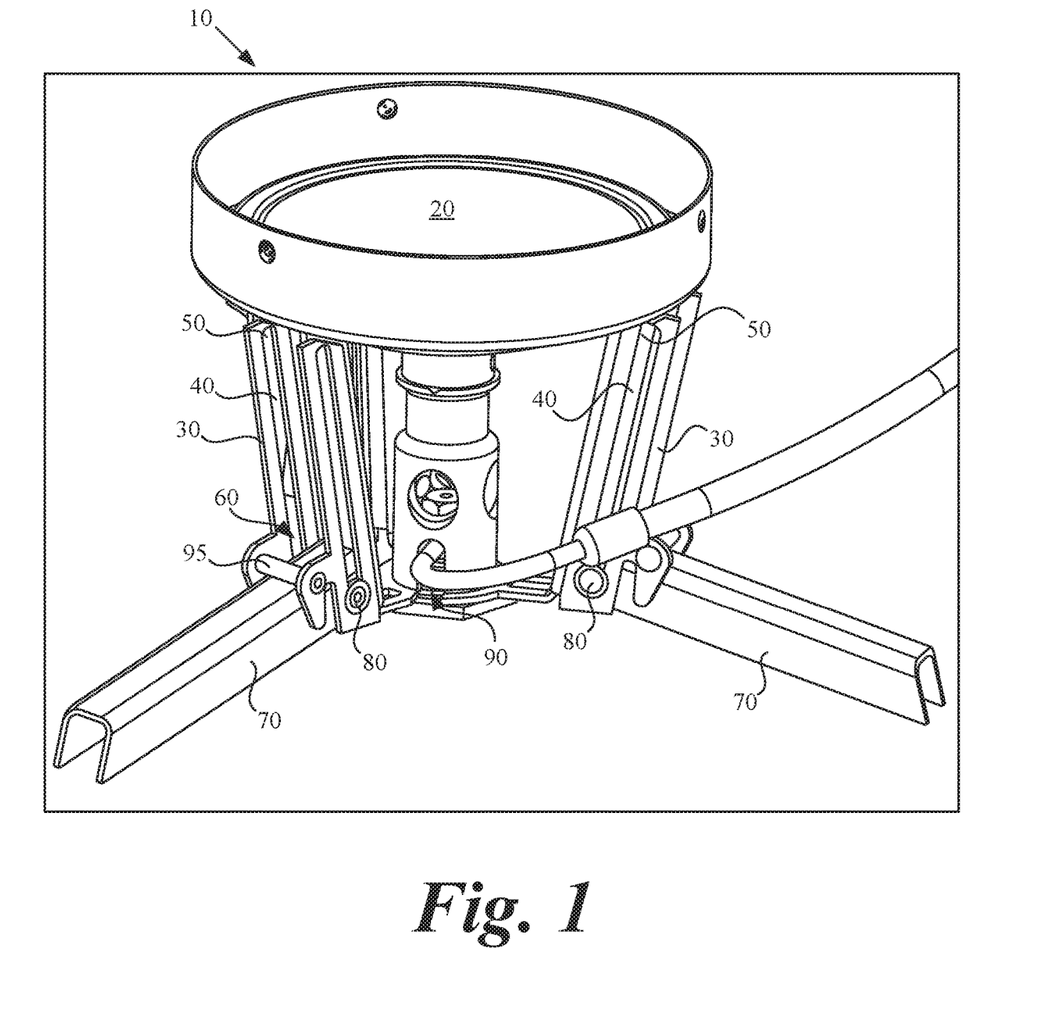
FIGS. 1-2 illustrate a portable-device support apparatus according to a first embodiment.
Figure 2:
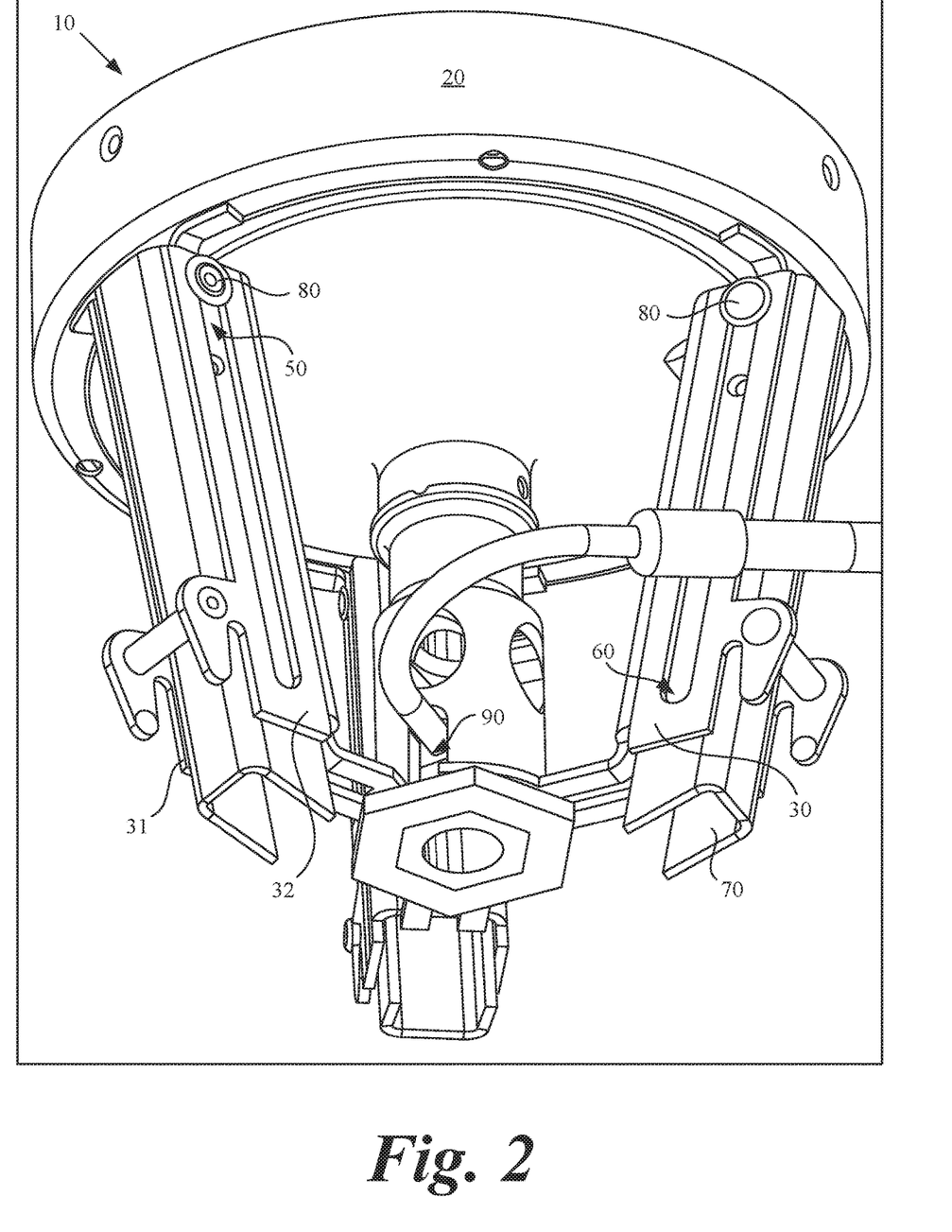

Referring now to FIGS. 1 and 2, shown is a portable-device support apparatus, such as a stove 10, according to a first embodiment of the invention. Stove 10 includes a surface element 20 on which, for example, a cooking pot may be placed for heating.

Stove 10 further includes a plurality of first support elements, such as mounts 30, coupled to the surface element 20. Each mount 30 may be directly coupled to the surface element 20. Each of the mounts 30 has one or more slot portions 40 formed therein. More specifically, each of the mounts 30 may include opposing walls 31, 32 within which the slot portions 40 are formed. Each slot portion 40 has an end 50 proximal to the surface element 20 and an end 60 distal from the surface element. Each slot portion 40 is closed at both the proximal and distal ends 50, 60.

Stove 10 further includes a plurality of second support elements, such as elongate legs 70 and a plurality of fastening devices, such as pins 80. Each leg 70 is coupled to a respective mount 30 by a respective one of the pins 80 positioned within respective slot portions 40. Each pin 80 is configured to translate back and forth within the slot portions 40 between the proximal and distal ends 50, 60. The translational movement of each pin 80 within each slot portion 40 is at least partially rectilinear.

As best shown in FIG. 1, stove 10 has a deployed position in which each pin 80 is at the distal end 60 and each leg 70 extends at an angle from the mount 30 to which each leg is coupled. Stove 10 may further include one or more rivets 95 that, when stove is in the deployed position, serves to stabilize and constrain the position of each leg 70. As best shown in FIG. 2, stove 10 has a storage position in which each pin 80 is at the proximal end 50 and at least a portion of each leg 70 is parallel with at least a portion of the mount 30 to which each leg is coupled. Alternatively, in the stored position each leg 70 is not parallel with at least a portion of the mount 30, but rather at a different angle with respect to the mount, possibly past parallel. When in this stored position, each leg 70 is disposed at least partially within a respective mount 30.

Figure 8:
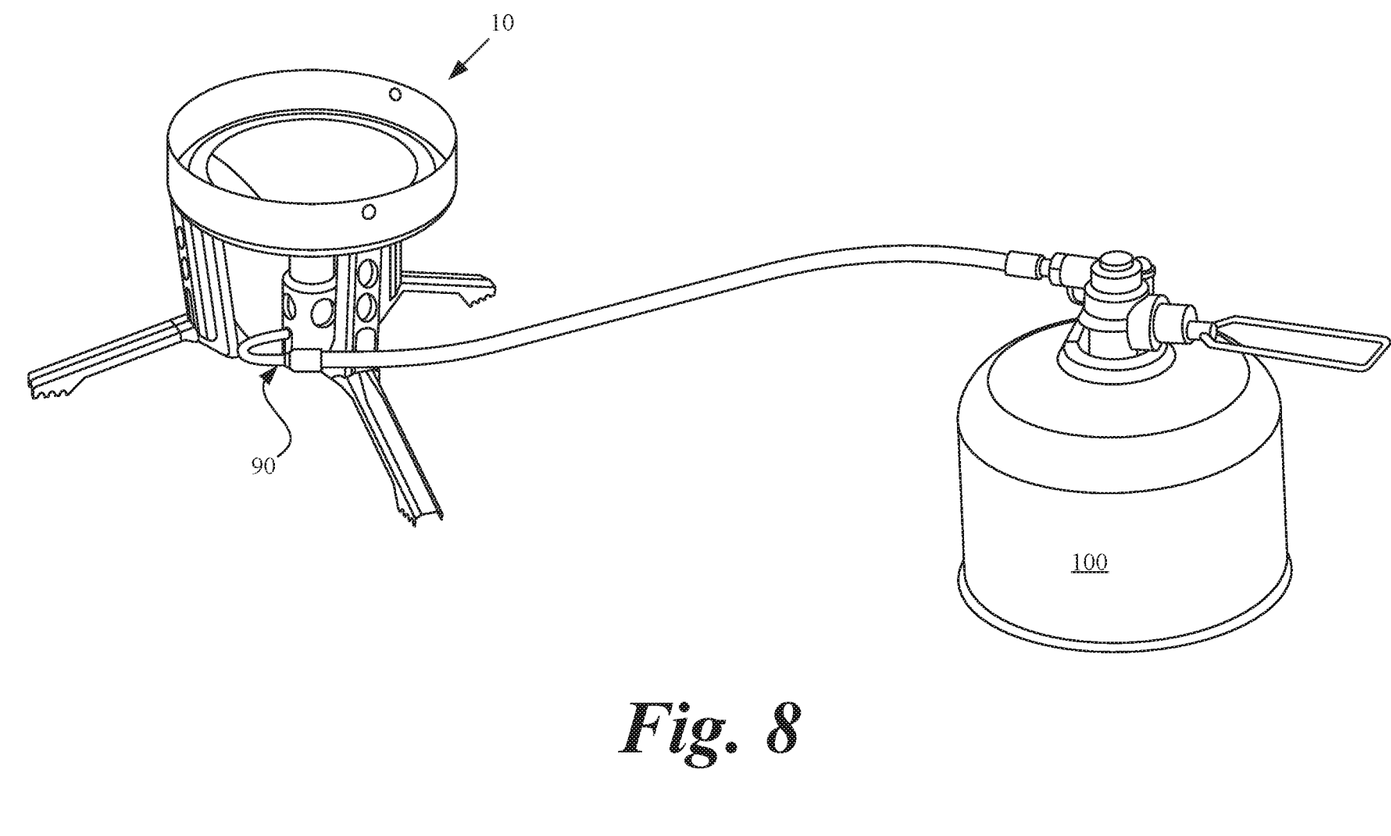
FIG. 8 illustrates a fuel canister and a portable-device support apparatus according to an embodiment.

Stove 10 further includes a port assembly 90 configured to receive combustible fuel from a fuel source 100 as is best illustrated in FIG. 8. The surface element 20 may be fluidly coupled to the port assembly 90 and configured to combust the fuel received by the port assembly.

Figure 3:
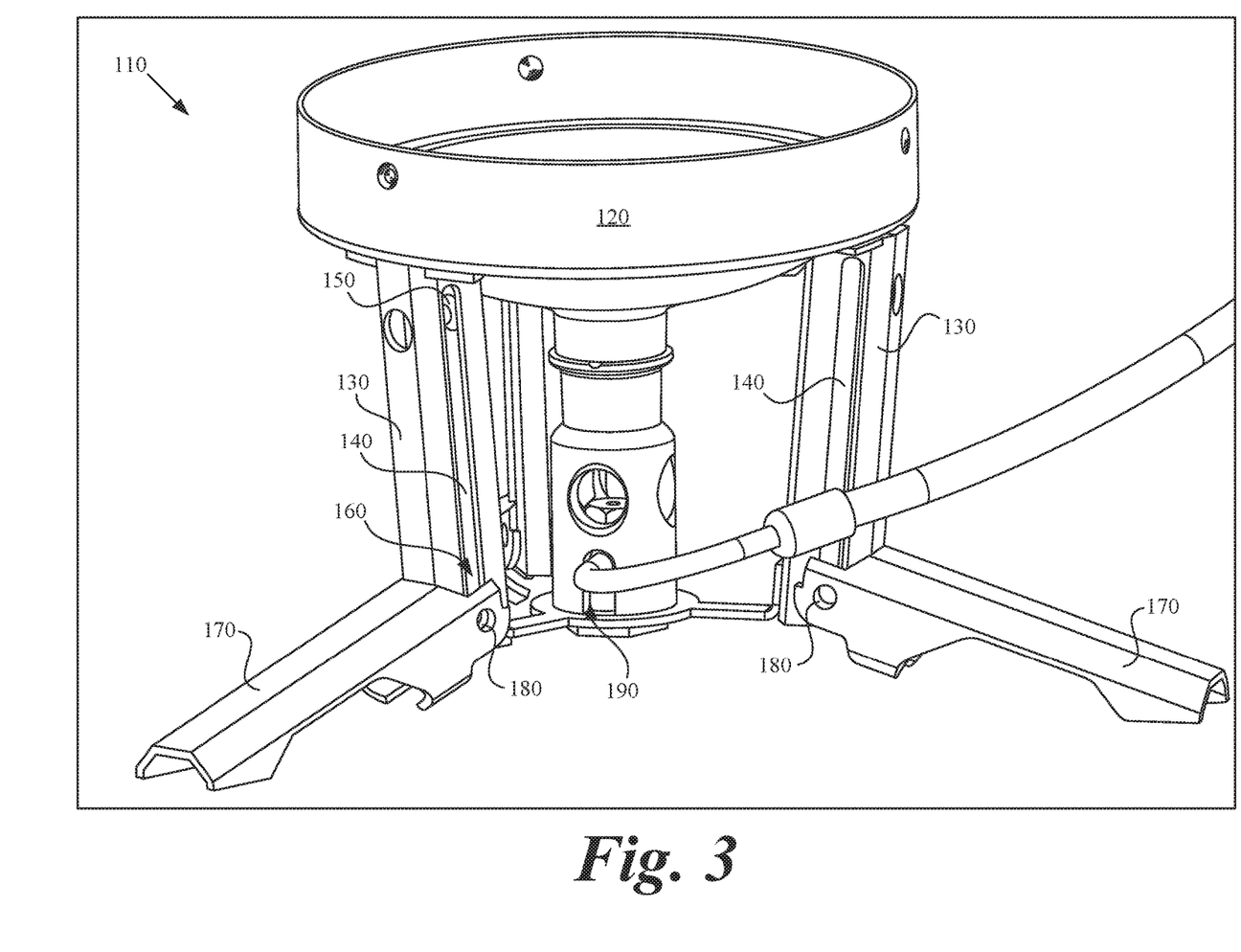
FIGS. 3-4 illustrate a portable-device support apparatus according to a second embodiment.
Figure 4:
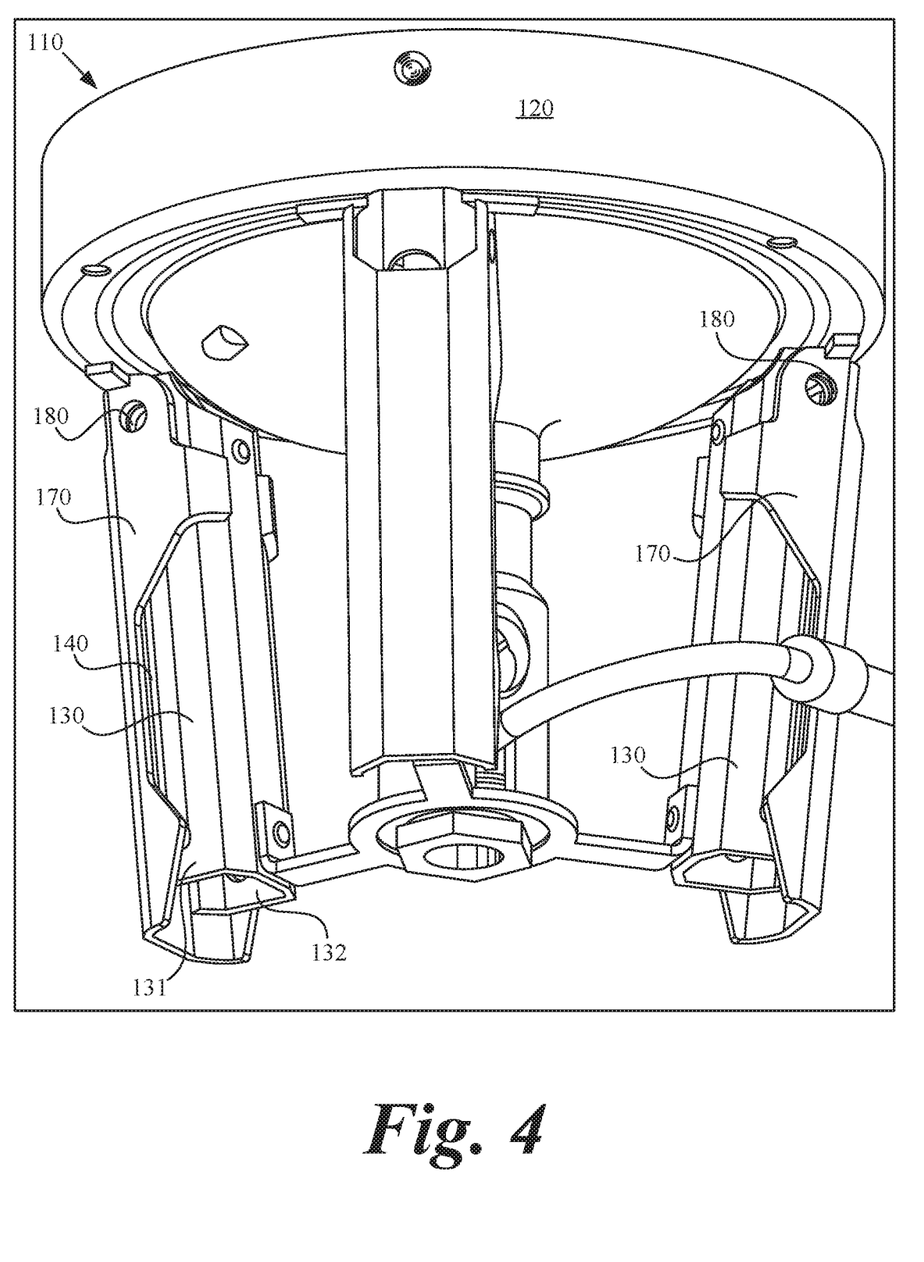

Referring now to FIGS. 3 and 4, shown is a portable-device support apparatus, such as a stove 110, according to a second embodiment of the invention. Stove 110 includes a surface element 120 on which, for example, a cooking pot may be placed for heating.

Stove 110 further includes a plurality of first support elements, such as mounts 130, coupled to the surface element 120. Each mount 130 may be directly coupled to the surface element 120. Each of the mounts 130 has one or more slot portions 140 formed therein. More specifically, each of the mounts 130 may include opposing walls 131, 132 within which the slot portions 140 are formed. Each slot portion 140 has an end 150 proximal to the surface element 120 and an end 160 distal from the surface element. Each slot portion 140 is closed at both the proximal and distal ends 150, 160.

Stove 110 further includes a plurality of second support elements, such as elongate legs 170 and a plurality of fastening devices, such as pins 180. Each leg 170 is coupled to a respective mount 130 by a respective one of the pins 180 positioned within respective slot portions 140. Each pin 180 is configured to translate back and forth within the slot portions 140 between the proximal and distal ends 150, 160. The translational movement of each pin 180 within each slot portion 140 is at least partially rectilinear.

As best shown in FIG. 3, stove 110 has a deployed position in which each pin 180 is at the distal end 160 and each leg 170 extends at an angle from the mount 130 to which each leg is coupled. As best shown in FIG. 4, stove 110 has a storage position in which each pin 180 is at the proximal end 150 and at least a portion of each leg 170 is parallel with at least a portion of the mount 130 to which each leg is coupled. When in this stored position, each mount 130 is disposed at least partially within a respective leg 170.

Stove 110 further includes a port assembly 190 configured to receive combustible fuel from a fuel source. The surface element 120 may be fluidly coupled to the port assembly 190 and configured to combust the fuel received by the port assembly.

Figure 5:
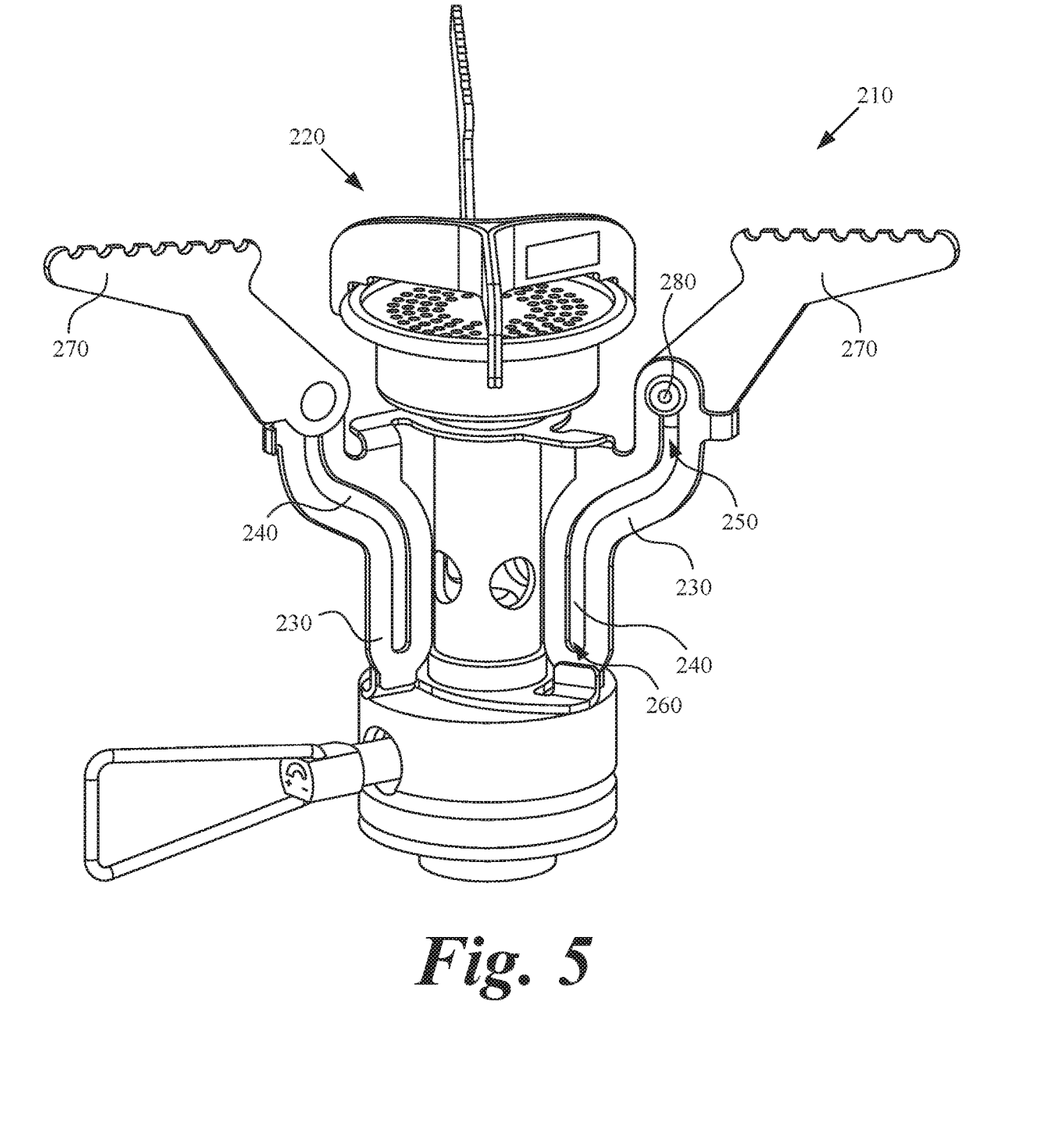
FIGS. 5-7 illustrate a portable-device support apparatus according to a third embodiment.
Figure 6:
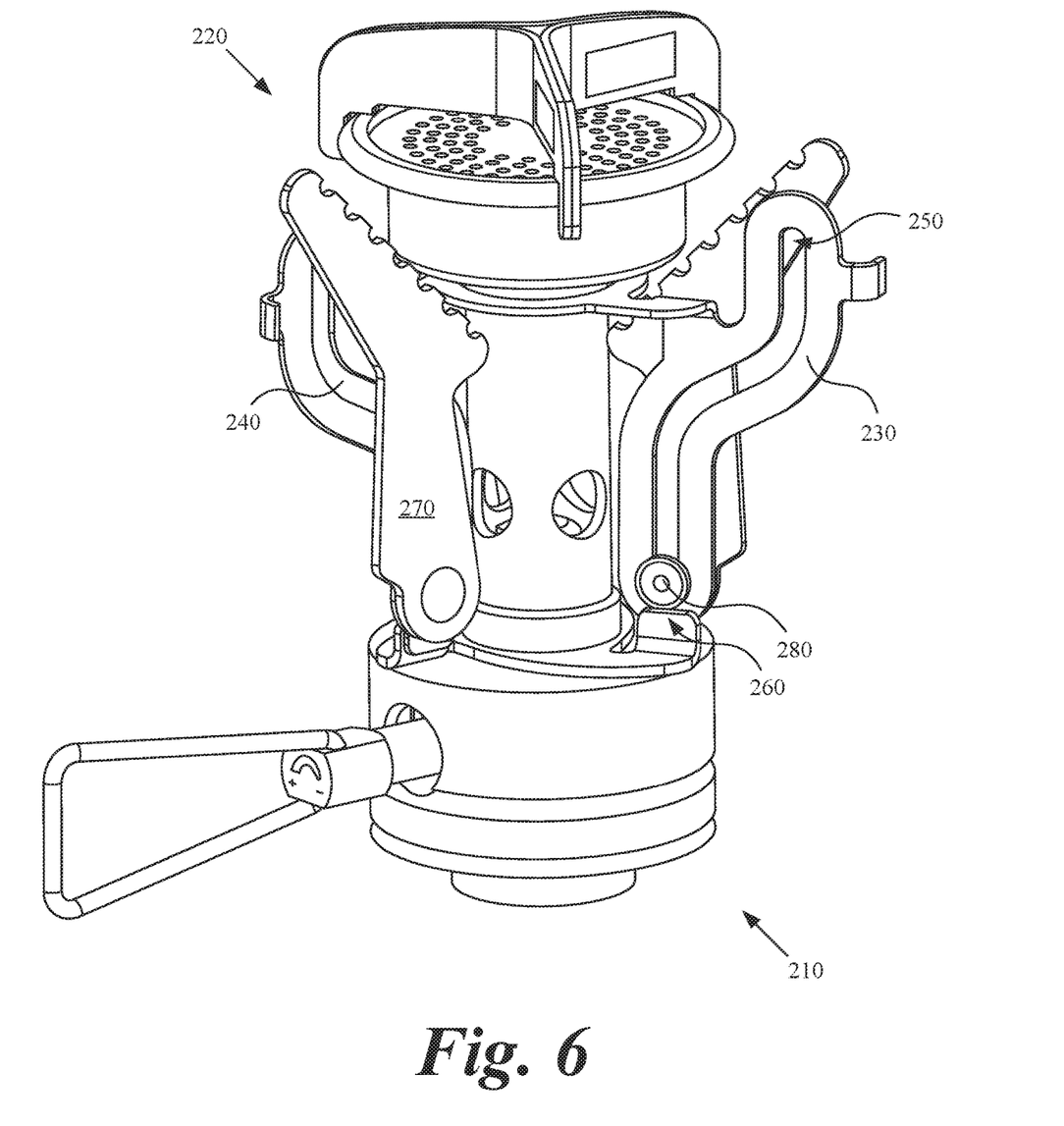
Figure 7:
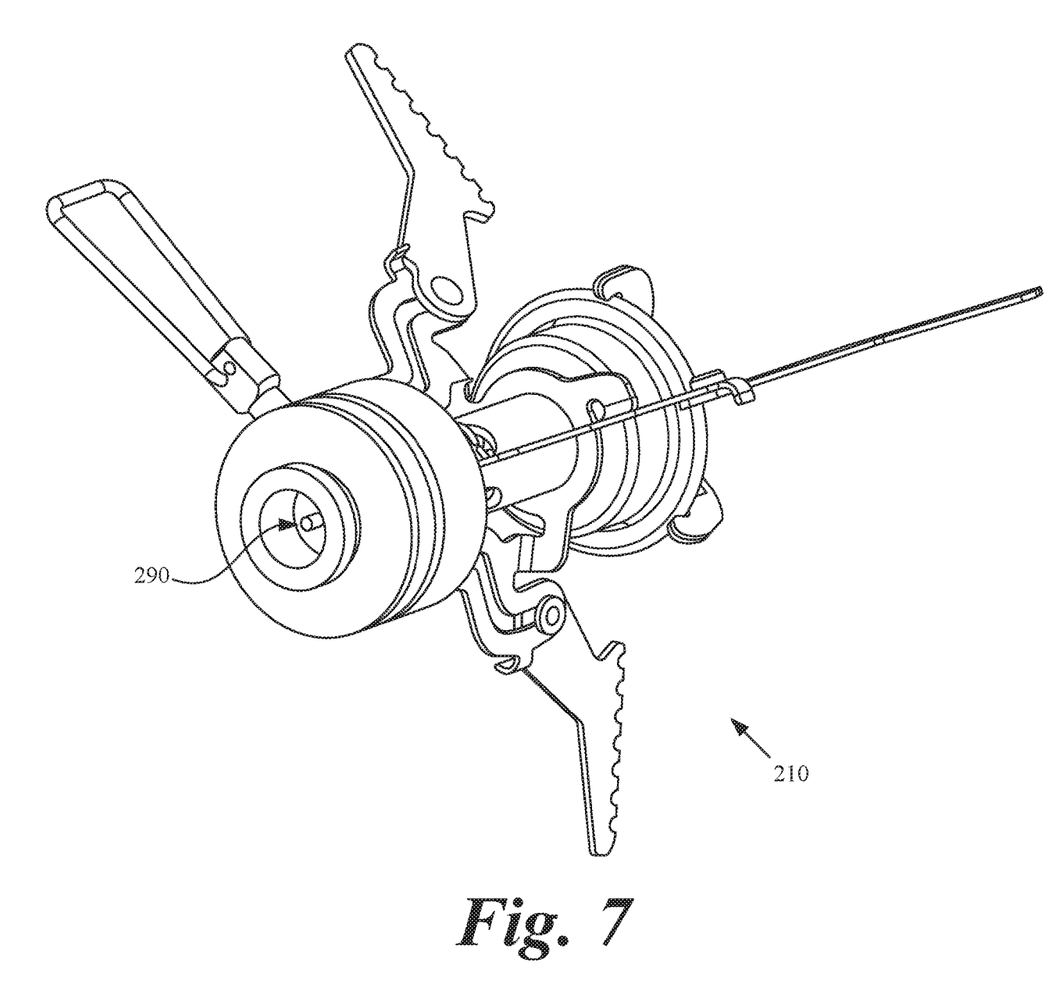

Referring now to FIGS. 5-7, shown is a portable-device support apparatus, such as a stove 210, according to a third embodiment of the invention. Stove 210 includes a surface element 220 over which, for example, a cooking pot may be placed for heating.

Stove 210 further includes a plurality of first support elements, such as mounts 230, coupled to the surface element 220. Each mount 230 may be directly coupled to the surface element 220. Each of the mounts 230 has one or more slot portions 240 formed therein. Each slot portion 240 has an end 250 proximal to the surface element 220 and an end 260 distal from the surface element. Each slot portion 240 is closed at both the proximal and distal ends 250, 260.

Stove 210 further includes a plurality of second support elements, such as elongate legs 270 and a plurality of fastening devices, such as pins 280. Each leg 270 is coupled to a respective mount 230 by a respective one of the pins 280 positioned within respective slot portions 240. Each pin 280 is configured to translate back and forth within the slot portions 240 between the proximal and distal ends 250, 260. The translational movement of each pin 280 within each slot portion 240 is at least partially curvilinear.

As best shown in FIG. 5, stove 210 has a deployed position in which each pin 280 is at the proximal end 250 and each leg 270 extends at an angle from the mount 230 to which each leg is coupled. As best shown in FIG. 6, stove 210 has a storage position in which each pin 280 is at the distal end 260 and at least a portion of each leg 270 is parallel with at least a portion of the mount 230 to which each leg is coupled.

Stove 210 further includes a port assembly 290 configured to receive combustible fuel from a fuel source. The surface element 220 may be fluidly coupled to the port assembly 290 and configured to combust the fuel received by the port assembly.

Figure 9:
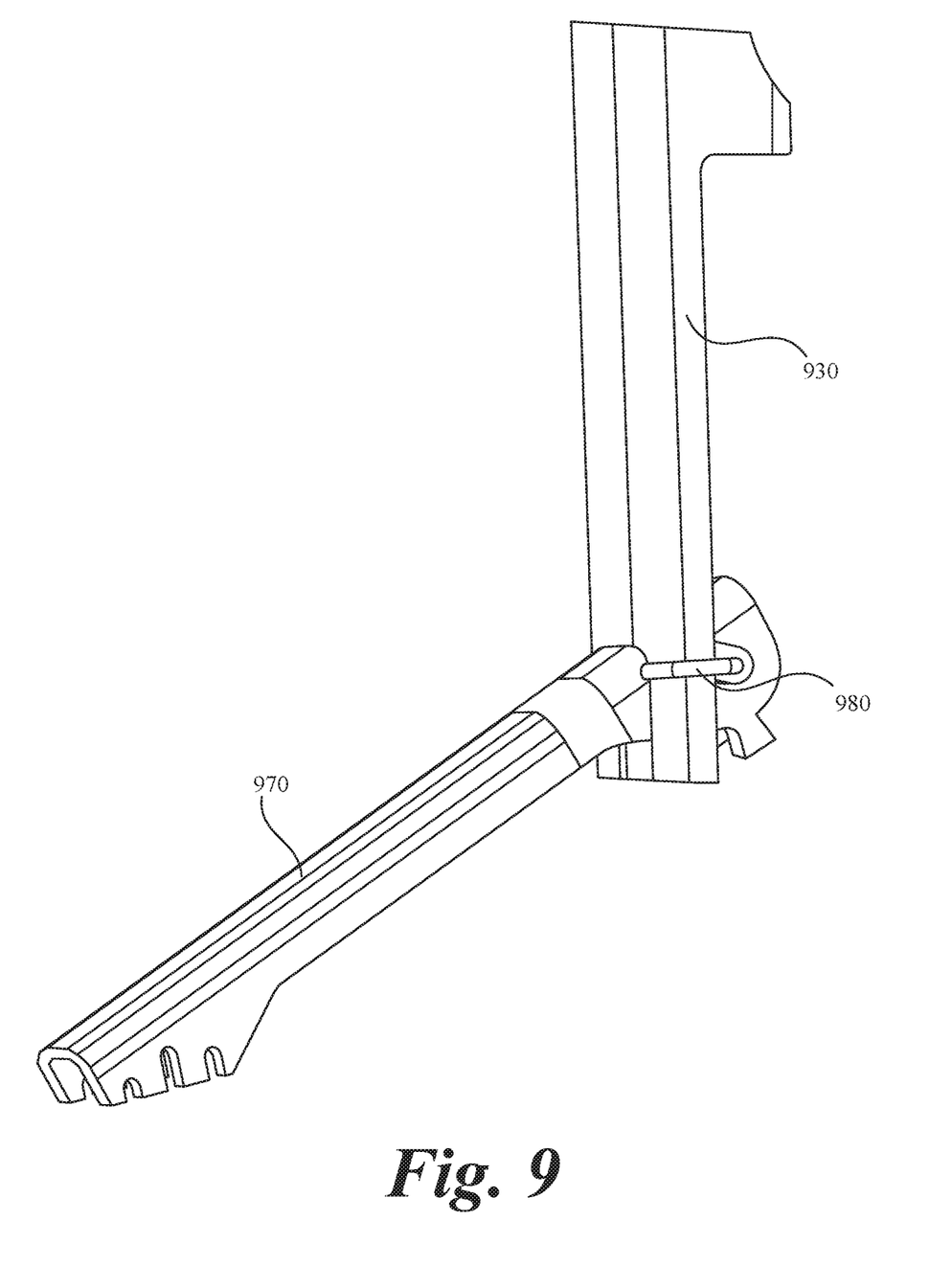
FIGS. 9-10 illustrate a portable-device support apparatus according to a fourth embodiment.
Figure 10:
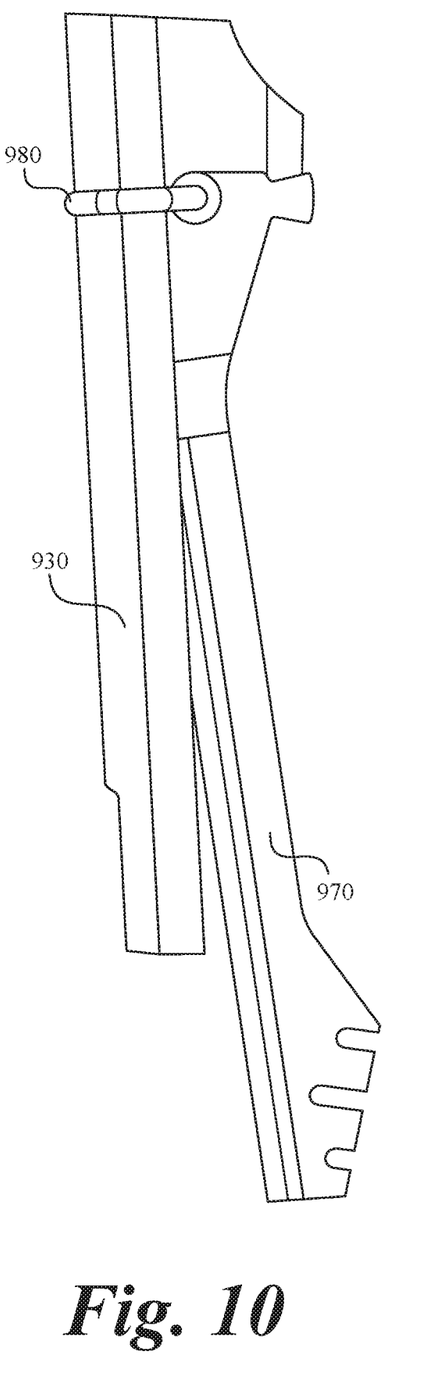

While the preferred embodiment of the invention has been illustrated and described, many changes can be made without departing from the spirit and scope of the invention. For example, the path of movement of the legs 70 need not be limited to movement within slot portions 40. In an embodiment, a rod coupled to the surface element 20 may set the path of movement of legs 70 with a hole in the legs into which the rod is inserted following such path. Additionally, referring to FIGS. 9 and 10 and in an alternative embodiment, pins 80 may be excluded; elements, such as followers 980, can be coupled to at least one of the mounts 930 and legs 970 and circumscribe the other of the mounts and legs to allow movement of the mounts and legs relative to each other. In an alternative embodiment, stove 10 could be configured such that the slot ends are equidistant from the surface element 20, without an identifiable distal or proximal end. Additionally, and in an embodiment, stove 10 may include springs that load the legs 70 into the deployed position. Accordingly, the scope of the invention is not limited by the disclosure of the preferred embodiment. Instead, the invention should be determined entirely by reference to the claims that follow.

What is claimed is:

1. A portable-device support apparatus, comprising:
  a surface element configured to support placement of a cooking pot;
  a plurality of first fixed support elements directly coupled to the surface element, each of the first fixed support elements having an end proximal to the surface element and an end distal from the surface element, wherein each of the first fixed support elements including opposing walls having a slot portion formed within each of the opposing walls, each slot portion having a proximal end proximal to the surface element and a distal end distal from the surface element, and each of the slot portions being closed within the corresponding opposing wall at the proximal end and the distal end;
  a plurality of second movable support elements; and
  a plurality of pins, each second movable support element being coupled to a respective first fixed support element by a respective one of the pins, wherein:
  each of the pins is positioned within a respective slot portion and is configured to translate back and forth within the respective slot portion along a respective one of the first fixed support elements between the proximal and distal ends, and
  the apparatus having a first deployed position in which each pin is at the distal end and each second movable support element is positioned at a first angle from the first fixed support element to which each second movable support element is coupled, and having a storage position in which each pin is at the proximal end and in which each second movable support element is positioned at a second angle from the first fixed support element, wherein the first angle is different from the second angle.

2. The apparatus of claim 1, wherein, in the storage position, each first fixed support element is disposed at least partially within a respective second movable support element.

3. The apparatus of claim 1, wherein, in the storage position, each second movable support element is disposed at least partially within a respective first fixed support element.

4. The apparatus of claim 1, wherein the translational movement of each pin is at least partially rectilinear.

5. The apparatus of claim 1, further comprising a port configured to receive combustible fuel.

6. The apparatus of claim 5, wherein the surface element is fluidly coupled to the port and configured to combust the fuel received by the port.

7. The apparatus of claim 1, further comprising a plurality of rivets, each rivet configured to stabilize and constrain a position of a respective one of the second movable support elements when the apparatus is in the deployed position.

* * * * *